May 4, 1937.                  C. M. BURRILL                  2,079,064
                              OVERVOLTAGE TIMER
                            Filed Dec. 31, 1935            2 Sheets-Sheet 1
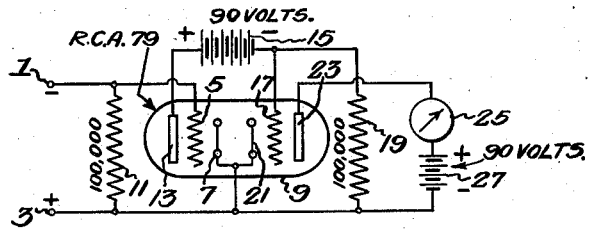
Fig. I.
Fig. II.
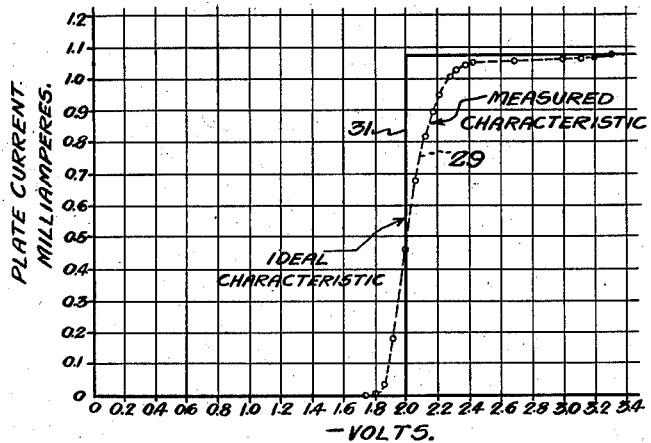
Fig. V.
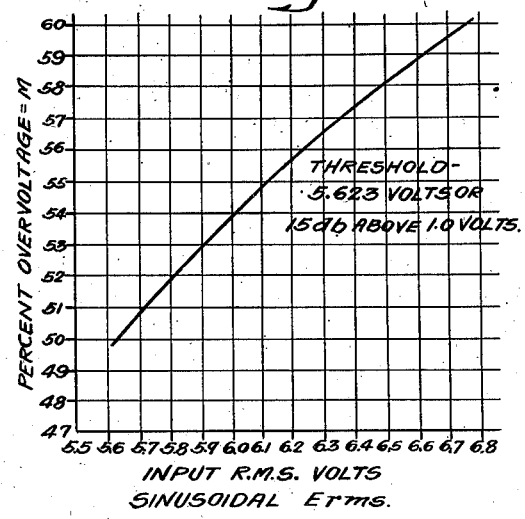
Witnesses:
Inventor
Charles M. Burrill
by
Attorney.

May 4, 1937.  C. M. BURRILL  2,079,064
OVERVOLTAGE TIMER
Filed Dec. 31, 1935  2 Sheets-Sheet 2
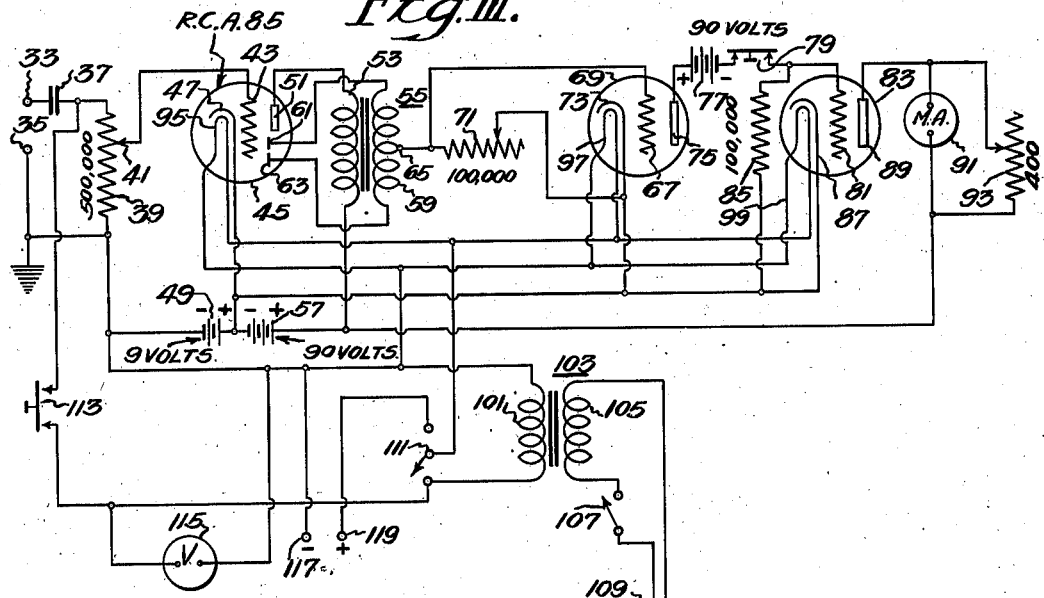
Fig. III.
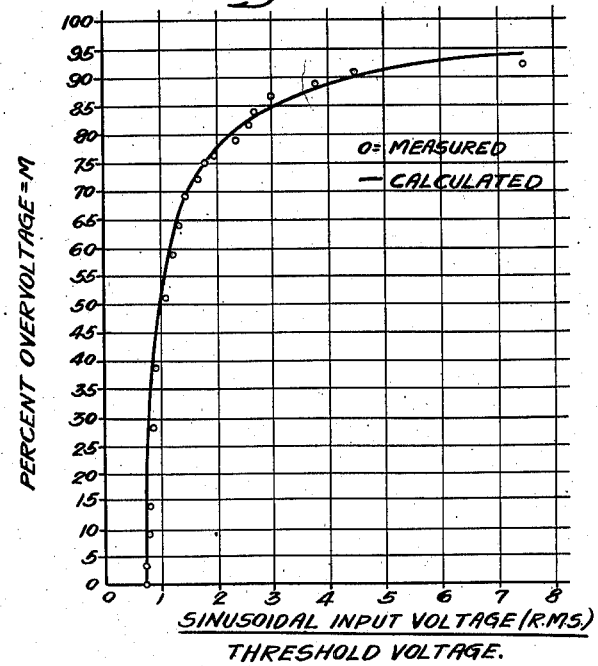
Fig. IV.
Witnesses:
C D Ruska
George L Jepson
Inventor
Charles M. Burrill
by N B Goldsborough
Attorney Patented May 4, 1937

2,079,064

UNITED STATES PATENT OFFICE 2,079,064

OVERVOLTAGE TIMER

Charles M. Burrill, Haddonfield, N. J., assignor to Radio Corporation of America, a corporation of Delaware Application December 31, 1935, Serial No. 56,962

8 Claims. (Cl. 175—183)

My invention relates to measuring noise levels caused by static or other disturbing electrical effects. More specifically, my invention is an apparatus for directly indicating the percentage of time the voltage of a given electrical disturbance exceeds a predetermined voltage level.

I am aware of numerous attempts to measure static levels, the peak voltages induced in a given collector by a static discharge, or the relative periods of static in excess of telegraph marker signals. A description of the last mentioned method has been published in the Proceedings of the Institute of Radio Engineers for February, 1935, by H. O. Peterson. This article is entitled "A Method of Measuring Noise Levels on Short Wave Radiotelegraph Circuits" and appears on pages 128 to 131. The subject matter of this application deals with a compact, simplified direct reading instrument which is an improvement over the apparatus described in the above mentioned publication.

The present invention may be used on alternating current circuits. The invention may be used on positive, negative, or both positive and negative cycles of alternating currents. The observation of the separate cycles; i. e., positive and negative cycles, is helpful in that it provides information about the wave form of static impulses.

One of the objects of my invention lies in an improved method for directly indicating the percentage of time a given threshold voltage is exceeded by peak voltages.

Another object is the design of a portable apparatus capable of directly indicating the percentage of time a predetermined voltage level is exceeded by positive or negative voltage impulses.

A further object is to improve the design of an overvoltage timer whereby the percentage of time of such excess voltage may be read directly for any one of a number of different threshold voltages.

Additional objects will appear in the accompanying specification, appended claims and drawings, in which Figure I is a schematic diagram of the resistance coupled amplifier used in my invention, Fig. II is a characteristic curve of the resistance coupled amplifier of Fig. I, Fig. III is a complete wiring diagram of an embodiment of my invention, Fig. IV is a graph showing the calculated and measured curves of percentage overvoltage, plotted against the ratio of the RMS value of a sinusoidal input voltage to the threshold voltage, and Fig. V is an enlarged curve of a section of the graph of Fig. IV plotted against the RMS value of a sinusoidal input voltage.

In Fig. I, a resistance coupled amplifier is connected as follows: A pair of terminals 1, 3 are connected, respectively, to a grid 5 and cathode 7 of a dual tube 9. Two separate tubes may be used. A resistor 11 of the order of 100,000 ohms is connected from the grid 5 to the cathode 7. An anode 13 is connected to the positive terminal of a B battery 15 whose potential may be about 90 volts. The negative terminal of the battery is connected to a grid 17 and through a resistor 19 to the cathode 21. The cathodes 7 and 21 may be a single cathode, if the RCA dual amplifier 79 is used. The resistor 19 may be of the order of 100,000 ohms.

The anode 23 is connected through a milliammeter 25 to the positive terminal of a B battery 27. The negative terminal of the B battery 27 is connected to the cathode 21. The milliammeter 25 should be one having a slow movement. I have found a Weston Model 301 having an indicator whose natural period is of the order of 1.5 seconds satisfactory. The meter is critically damped or overdamped by a shunting resistor which is also used to adjust the sensitivity of the meter. The cathode heater and its circuit have been omitted from this illustration.

The operation of Fig. I is as follows: If no potential is applied between the input terminals 1—3, the normal voltage drop across resistor 19 will be sufficient to bias the grid 17 to a negative potential which will block the flow of current between the cathode 21 and anode 23. If an increasingly negative potential is applied to the grid 5, less current will flow through the resistor 19 and the negative potential of grid 17 will gradually decrease. The decreasingly negative potential on grid 17 is limited to a substantially zero potential which appears when the flow of current from anode 13 to cathode 7 is blocked. With the constants given, the anode current flow from the anode 23 to cathode 21 will normally begin at a negative voltage of about 1.8 applied to the input of the amplifier and will sharply increase until the negative applied input voltage is about 2.3. At this voltage, the output current of the amplifier has reached a maximum and tends to remain substantially constant for increasing negative input voltages.

The characteristic curve for the amplifier has been illustrated in Fig. II as curve 29. The ideal characteristic has been represented in this figure as graph 31. The actual characteristics of the amplifier are a sufficient proximation to insure the desired performance. An inspection of the curve 29 will show that an impressed pulsating voltage of sufficient magnitude will establish a substantially rectangular output current. If the input voltage is less than the threshold of 2 volts, the output current is substantially zero. Whenever the input voltage substantially exceeds the threshold voltage of 2, the output current will be limited to a substantially constant value of about 1.07 milliamperes, as shown.

The duration of a pulse exceeding the threshold voltage is the time interval such pulse exceeds the threshold value. The integral of the output current is proportional to the time the input voltage exceeds the threshold. The output current may be integrated as a practical matter by a slow acting or ballistic direct current milliammeter. The Weston Model 301 milliammeter meets these requirements and may be used with a linear scale indicating from 0 to 100%.

As a practical matter, I prefer to operate the instrument from pulsating or alternating current by connecting an amplifier followed by a rectifier before the input terminals of the resistance coupled amplifier. The rectifier may be connected to rectify on either one or the other half cycle of alternating current, or both half cycles. This permits information to be obtained about the wave forms of static impulses.

The complete circuit diagram appears in Fig. III. A pair of input terminals 33—35 are connected respectively to a blocking capacitor 37 and to ground. An attenuator or potentiometer 39 is connected from the blocking capacitor 37 and to ground. The slider 41 of the attenuator 39 is connected to the grid 43 of thermionic amplifier tube 45. The cathode 47 of tube 45 is connected to the positive terminal of C battery 49. The negative terminal of the C battery is grounded.

The anode 51 is connected through the primary 53 of transformer 55 to the positive terminal of B battery 57. The negative terminal of this battery 57 is connected to cathode 47. The outer terminals of the secondary 59 of transformer 55 are connected to the anodes 61—63 of a full wave rectifier which may be part of tube 45 or a separate rectifier.

The secondary 59 is tapped at its center. This center tap 65 is connected to the grid 67 of the triode 69. A variable resistor 71 is connected between grid 67 and cathode 73 of tube 69. The cathode 73 of tube 69 is also connected to the cathode 47 of tube 45. The anode 75 is connected to the positive terminal of B battery 77. The negative terminal of battery 77 is connected to a switch or push button 79.

The push button in turn is connected to the grid 81 of the triode 83, and to a resistor 85. The lower terminal of the resistor 85 is connected to the cathode 73 of the first triode 69 and cathode 87 of the second triode 83. The anode 89 of the second triode 83 is connected to a slow acting milliammeter 91. The milliammeter is connected to the positive terminal of the B battery 57. The milliammeter is shunted by a variable resistor 93. The heaters 95, 97, 99 are connected in parallel. One of the leads from the heaters is connected to the secondary 101 of a transformer 103. The primary 105 is connected through a switch 107 to a plug 109. The plug may be connected to a suitable alternating current supply. The other lead from the heaters is connected to the center of a single pole double throw switch 111. One of the fixed terminals of this switch is connected to the remaining secondary terminal of transformer 103.

This same terminal is connected to one terminal of a push button 113. The other terminal of the push button 113 is connected to the junction of the blocking capacitor 37 and attenuator 39. The other terminal of the transformer secondary 101 is connected to ground and the input terminal 35. The transformer 103 is generally a stepdown transformer to convert 110 volts alternating current to a lower voltage for the heaters 95, 97 and 99. An alternating current voltmeter 115 is connected across the secondary 101 of transformer 103. Terminals 117, 119 for heating the filaments by direct current, such as a storage battery, are connected respectively to the input terminal 35 and to the remaining contact of the single pole double throw switch 111.

The use of a high impedance input circuit makes the device suitable for measurements on alternating current circuits of poor regulation. The blocking condenser 37 prevents direct current components from affecting the instrument. The attenuator 39 is preferably one having a total resistance of 500,000 ohms with steps corresponding to attenuations of 2.5 decibels each. The attenuator may be calibrated to indicate the threshold value in volts, or in decibels above a reference level of one volt, or in decibels referred to any other convenient voltage level.

The method of adjusting the overvoltage timer so that it will read directly in percentage is to first open the switch 79, which opens the anode circuit of the first triode 69 of the resistance coupled amplifier. The resistor 93 which shunts the output meter 91 is then adjusted until the meter gives full scale or 100% indication, after which the switch is again closed.

Next, resistor 71 is adjusted until the actual operating threshold voltage is that indicated by the dial of attenuator 39. This is accomplished using a test voltage of known magnitude and wave shape. For such a test voltage and a given threshold voltage the per cent overvoltage may be calculated. Then resistor 71 may be adjusted until this calculated value is actually indicated by the output meter. A sinusoidal alternating voltage may be conveniently used for this test, and if such a voltage is already in use to energize the heater circuits, it may be obtained from the same source.

Assuming sinusoidal wave form, the percentage of the time that the instantaneous voltage exceeds any given threshold value may be calculated as follows:

Let $E_o$ = a given threshold voltage $$e = E_{max} \sin \omega t = \text{impressed voltage}$$

$$E_{rms} = \frac{\sqrt{2}}{2} E_{max} = \text{effective value of } e$$

$M$ = percentage overvoltage; i. e., the percentage of the time during which $|e| > E_o$ It can be shown that $$\frac{E_{rms}}{E_o} = \frac{1}{\sqrt{2}\left[\cos\left(\frac{\pi M}{200}\right)\right]}$$

From this equation, the relationship between the RMS value of a sinusoidal input voltage divided by the threshold voltage and the corresponding percentage overvoltage may be calculated. This calculated relationship appears as a curve in Fig. IV. These calculated values may be checked by applying known sinusoidal test voltages to the input circuit of the overvoltage timer and observing the readings of the output meter. Such measured values are shown as small circles in Fig. IV. The measured and calculated values are in sufficient agreement for all practical purposes. The agreement further indicates that the departure of the measured characteristic from the ideal characteristic of Fig. II is of no practical importance.

In the practical use of the sinusoidal alternating voltage of the heater circuits as a test voltage for adjustment, I have found it expedient to use an attenuator setting corresponding to a threshold voltage of 5.623 volts or 15 decibels above a reference level of one volt. With such a threshold voltage and the usual heater voltage of about 6 volts (RMS), the per cent overvoltage is about 50% and this is a convenient value which leads to an accurate adjustment. In this case, the curve of Fig. IV may be modified and a portion enlarged for more convenient use. Fig. V is such a modification in which percentage overvoltage M is plotted against the RMS value of a sinusoidal input voltage for the restricted range from 5.6 to 6.8 volts, and for the single threshold voltage of 5.623 volts or 15 db. above 1 volt. The adjustment then consists in obtaining with the test voltage an output indication corresponding to Fig. V.

I have already described the method of adjusting the meter to indicate the maximum of 100%. The method of establishing a point on the meter scale which will correspond to the curve of Fig. V is as follows: Closing the push button switch 113 completes the alternating current circuit across the attenuator 39. The attenuator is set at 15 decibels above the one volt reference level. The RMS voltage impressed on the input is read directly from the voltmeter 115. For the indicated voltage, the proper percentage reading of the output meter 91 is determined from the curve of Fig. V. The output of the rectifier is adjusted by varying the value of the resistor 71 across the input of the first triode resistance coupled amplifier 69 until the output meter 91 indicates the proper percentage.

After the maximum or 100% reading and the second reading at about 50% have been adjusted, all the intermediate values between 0 and 100% will be properly indicated. Thereafter, the meter will read directly the percentage of time that peak voltages exceed any predetermined threshold voltage. It should be understood that the attenuator may be adjusted to any desired threshold value.

Numerous modifications within the scope of my invention will occur to those skilled in the art. For example, a simple switching arrangement may be employed to convert the rectifier system from a full wave to a half wave device operating on either half cycle of alternating current. Likewise, it may be desirable to operate the percentage overvoltage meter so that the full scale deflection will represent ten percent or some other percentage than 100%. In a similar manner, the threshold voltage may be determined and adjusted in other ways, for example, by a variable grid bias for the triode 69, or by applying a bias to the rectifier, instead of an attenuator in the input circuit, as shown.

Such modification may be made by using a properly arranged meter shunt network. In view of these and other modifications, I only limit my invention as required by the prior art and appended claims.

I claim:

1. In a device of the character described, an amplifier having input and output circuits, means for establishing an operating threshold voltage, means for rectifying the output currents of said amplifier, a pair of tubes connected as a direct current amplifier, means for impressing the rectified currents from said rectifier on the input of said direct current amplifier, and means associated with said pair of tubes for indicating directly the percentage of time voltages applied to the first mentioned input circuit exceed said threshold voltage.

2. In a device of the character described, an amplifier having input and output circuits, an attenuator for establishing an operating threshold voltage, means for rectifying the output currents of said amplifier, a pair of tubes connected as a direct current amplifier, means for impressing the rectified currents from said rectifier on the input of said direct current amplifier, and means associated with said pair of tubes for indicating directly the percentage of time voltages applied to the first mentioned input circuit exceed said threshold voltage.

3. In a device of the character described, an amplifier having input and output circuits, means for establishing an operating threshold voltage, a full wave rectifier for rectifying the output currents of said amplifier, a pair of tubes connected as a direct current amplifier, means for impressing the rectified currents from said rectifier on the input of said direct current amplifier, and means associated with said pair of tubes for indicating directly the percentage of time voltages applied to the first mentioned input circuit exceed said threshold voltage.

4. In a device of the character described, an amplifier having input and output circuits, means for establishing an operating threshold voltage, means for rectifying the output currents of said amplifier, a pair of tubes connected as a direct current amplifier, means for normally biasing one of said tubes to cut off its anode current, means for impressing the rectified currents from said rectifier on the input of said direct current amplifier, and means associated with said pair of tubes for indicating directly the percentage of time voltages applied to the first mentioned input circuit exceed said threshold voltage.

5. An overvoltage timer comprising an amplifier having input and output circuits, an attenuator for establishing an operating threshold voltage, a full wave rectifier for rectifying the output currents of said amplifier, a pair of tubes connected as a direct current amplifier, means for normally biasing one of said tubes to cut off its anode current, means for impressing the rectified currents from said rectifier on the input of said direct current amplifier, and means associated with said pair of tubes for indicating directly the percentage of time voltages applied to the first mentioned input circuit exceed said threshold voltage.

6. An overvoltage timer comprising an amplifier having input and output circuits, means for establishing an operating threshold voltage, means for rectifying the output currents of said amplifier, a pair of tubes connected as a direct current amplifier, means for impressing the rectified currents from said rectifier on the input of said direct current amplifier, means associated with said pair of tubes for indicating directly the percentage of time voltages applied to the first mentioned input circuit exceed said threshold voltage, and means for adjusting said meter to register the required percentage at substantially full deflection.

7. An overvoltage timer comprising an amplifier having input and output circuits, means for establishing an operating threshold voltage, means for rectifying the output currents of said amplifier, a pair of tubes connected as a direct current amplifier, means for impressing the rectified currents from said rectifier on the input of said direct current amplifier, means associated with said pair of tubes for indicating directly the percentage of time voltages applied to the first mentioned input circuit exceed said threshold voltage, means for adjusting said meter to register the required percentage at substantially full deflection, and means for adjusting the deflection of said meter intermediate between zero and maximum deflections to indicate the correct percentage of a known applied overvoltage.

8. In a device of the character of claim 1, means for energizing said amplifiers comprising in part an alternating current source, and means for impressing said alternating current on the first mentioned input circuit for checking the output meter reading.

CHARLES M. BURRILL.